(No Model.)
J. RIEPPEL.
PULLEY.
No. 423,180. Patented Mar. 11, 1890.
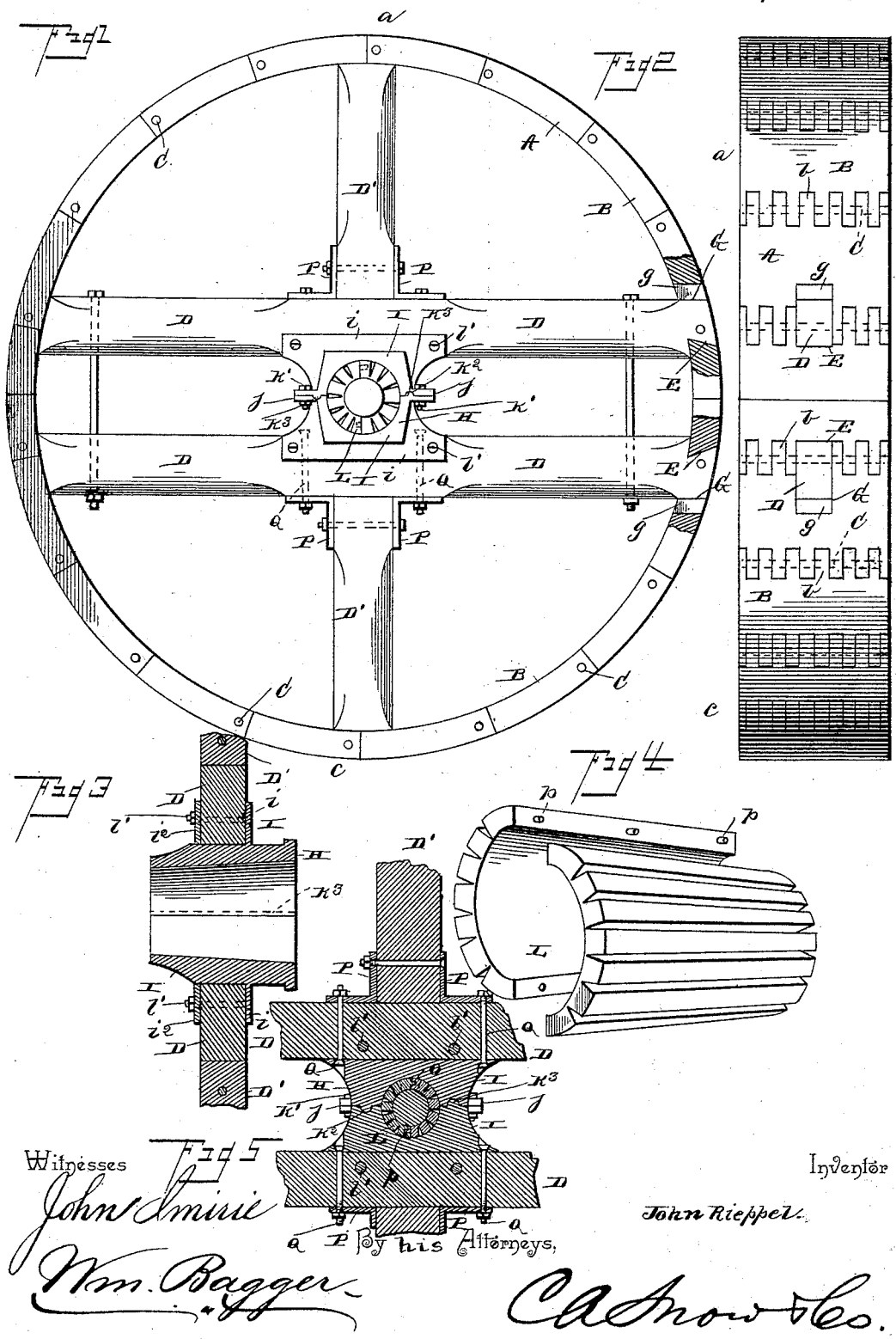

UNITED STATES PATENT OFFICE.

JOHN RIEPPEL, OF COWANESQUE, PENNSYLVANIA.

PULLEY.

SPECIFICATION forming part of Letters Patent No. 423,180, dated March 11, 1890.

Application filed February 12, 1889. Serial No. 299,567. (No model.)

*To all whom it may concern:*

Be it known that I, JOHN RIEPPEL, a citizen of the United States, residing at Cowanesque, in the county of Tioga and State of Pennsylvania, have invented new and useful Improvements in Combination-Pulleys, of which the following is a specification.

This invention relates to certain improvements in split pulleys; and it has for its object to provide a device of this class which shall combine the lightness and cheapness of a wooden pulley with the strength, rigidity, and slight resistance to the air of pulleys constructed of iron.
With these ends in view the invention consists in the improved construction, arrangement, and combination of parts, which will be hereinafter fully described with reference to the drawings, in which—
Figure 1 is a side view of a pulley embodying my improvements, part of the rim having been broken away for the purpose of showing the invention more clearly. Fig. 2 is an end view or edge view of the same. Fig. 3 is a longitudinal sectional view of the hub and adjacent parts. Fig. 4 is a perspective view showing the bushing used in connection with my invention, showing the parts or sections of said bushing slightly separated. Fig. 5 is a transverse sectional view of the hub and adjacent parts, showing the bushing arranged therein and clamped upon a shaft.

The same letters refer to the same parts in all the figures.
A designates the rim of my improved pulley, which is composed of a series of arc-shaped sections B B, which are provided on their meeting edges with tenons $b\ b$, which interlock, and which are held together by transverse pins C C, passing through the said tenons. The pulley is provided with the parallel spokes D D and with the radial spokes D' D', the inner ends of which are tenoned in the outer sides of the parallel spokes and secured thereto by means of angle-plates P, attached thereto by means of suitable bolts Q. The ends of the spokes D' are simply mortised into the rim, while the ends of the spokes D are connected with the rim by dovetailed tenons E, the mortises G being made of such a size that one of the ends of the said spokes may be passed completely through the same, so as to enable the opposite end to be seated in its mortise. The first end of the spoke is then brought to its seat and secured by means of a key $g$ in the usual well-known manner.

In the construction of the pulley the arc-shaped sections composing the rim are first put together. The rim is then turned to its proper shape, the inner and outer sides of the same being nearly parallel, but tapering slightly to both edges. The rim is next split or divided into the two parts or sections $a\ c$, and the spokes D D' are finally secured in their proper positions.

The hub H, which is arranged between the central portions of the spokes D D, is composed of two correspondingly-shaped sections I I, provided with integral flanges $i\ i$ and loose plates $i^2\ i^2$, fitting on either side of the spokes D and attached firmly thereto by means of bolts $l'$. The meeting edges of the hub-sections I are provided with flanges $j$, the meeting edges of which are provided, respectively, with grooves $k^2$ and ribs $k^3$, entering said grooves and serving for the purpose of holding the parts of the hub in alignment. The hub-sections are connected by means of bolts $k'$, passing through the meeting flanges, as shown in Fig. 1. The bore of the hub is tapering, as will be seen in Fig. 3, and is thereby adapted to receive a bushing L, made of wood in two sections, and having a cylindrical bore and a tapering outer side to correspond with the bore of the hub. The said bushing is provided on its outer side with a series of longitudinal grooves or kerfs, whereby each of its sections is subdivided into a series of segments L, whereby the said bushing is enabled to adjust itself upon the shaft.

In affixing or securing the pulley upon a shaft the bolts in the meeting flanges of the hub are first partially loosened. The sections of the bushing L are then adjusted around the shaft and driven into the hub as tightly as possible, after which the bolts connecting the sections of the hub are tightened, thus clamping the hub securely upon the bushing and the latter upon the shaft. If the pulley should become loosened in the course of time, it is only necessary to loosen the hub-section, drive the bushing farther in, and tighten the parts, as before.

Although I prefer to make the bushing L of wood, which yields readily to the adjustment, it is obvious that it may, when desired, be constructed of metal without departing from the spirit of my invention.

The operation and advantages of this invention will be readily understood from the foregoing description, taken in connection with the drawings hereto annexed.

By constructing the rim of the short arc-shaped sections I am enabled to use the wood with the grain running nearly straight, and thus enabled to reduce the weight and bulk without sacrificing strength. This is important, inasmuch as the resistance to the atmosphere is thus lessened and the excessive fanning, which is a common objection to wood pulleys as ordinarily constructed, is obviated. For the same reason the spokes D D' are constructed with sharp edges, as will be seen in Fig. 1.

By the use of the tapering bushings I am enabled to compensate for wear upon the shaft, and my improved pulley will for this reason be found very durable.

In connecting the sections a c of the pulley the outer ends of the spokes D are to be connected by bolts F, which assist in holding the parts in shape.

I would state that whether a metallic or a wooden bushing is used the meeting edges of said bushing may be provided, respectively, with pins and with recesses to receive said pins, as shown in dotted lines in the drawings and indicated by letters o p, the purpose of such construction being to hold the sections of the bushing in proper alignment with each other, the advantage of which is obvious.

I am aware that bushings have been used in connection with split pulleys composed of sections connected together flexibly. Each of the sections of my improved bushing, of which sections there may be two or more, is composed of a single piece of material, wood or metal, as the case may be, which is provided with exterior longitudinal grooves or kerfs to enable it to adapt itself to the shaft upon which the pulley is to be mounted.

Having thus described my invention, I claim—

1. In a split pulley, the combination, with the hub having a tapering bore, of a bushing composed solely of integral wooden sections having a tapering outer side provided at intervals with longitudinal grooves, and provided at their meeting edges, respectively, with pins and recesses to hold said sections in alignment, substantially as set forth.

2. In a split pulley, the combination, with the hub having a tapering bore, of a correspondingly-tapered bushing composed solely of integral wooden sections, the outer sides of which are provided at intervals with longitudinal grooves, whereby the said sections are enabled to adjust themselves upon the shaft, substantially as set forth.

In testimony that I claim the foregoing as my own I have hereto affixed my signature in presence of two witnesses.

JOHN RIEPPEL.

Witnesses:
C. W. COBURN,
W. HOWARD.